Feb. 17, 1948.     M. F. MEADOWS     2,436,012
ASH TRAY
Filed Oct. 16, 1945     2 Sheets-Sheet 1
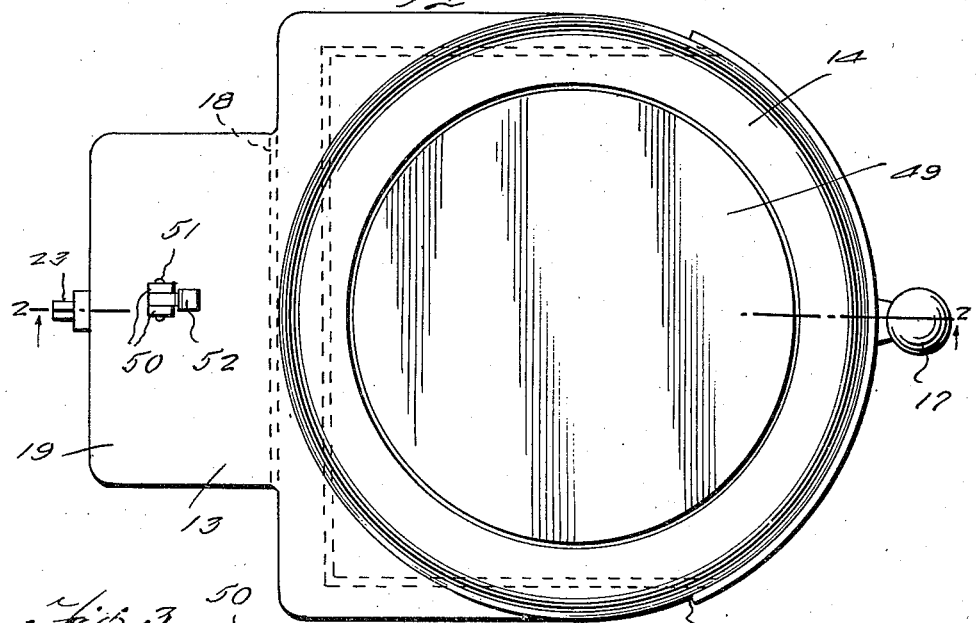
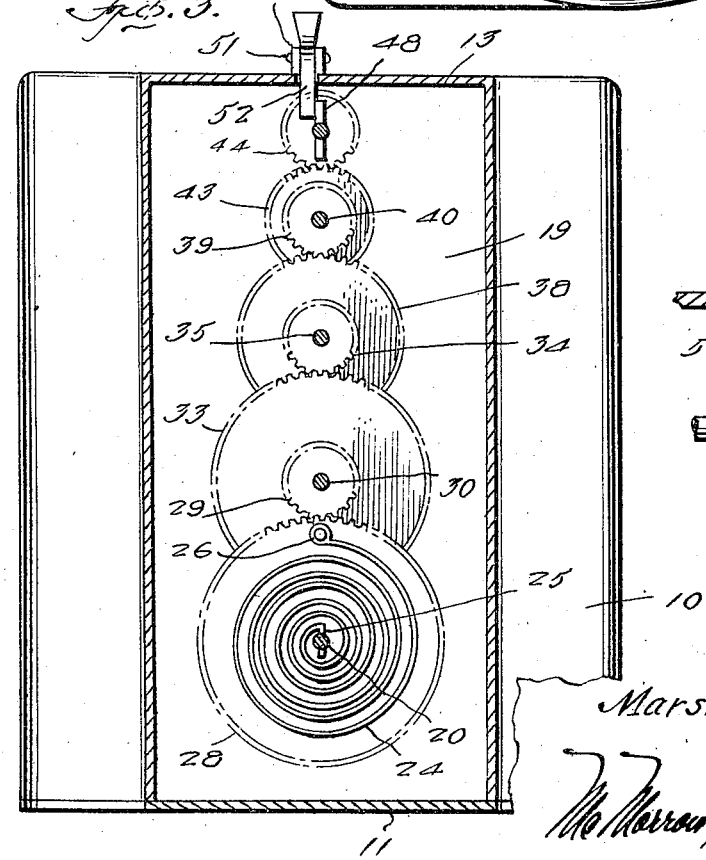
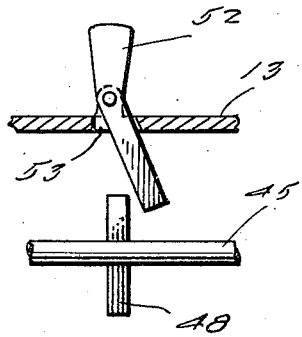
Inventor
Marshall F. Meadows Feb. 17, 1948.  M. F. MEADOWS  2,436,012
ASH TRAY
Filed Oct. 16, 1945  2 Sheets-Sheet 2
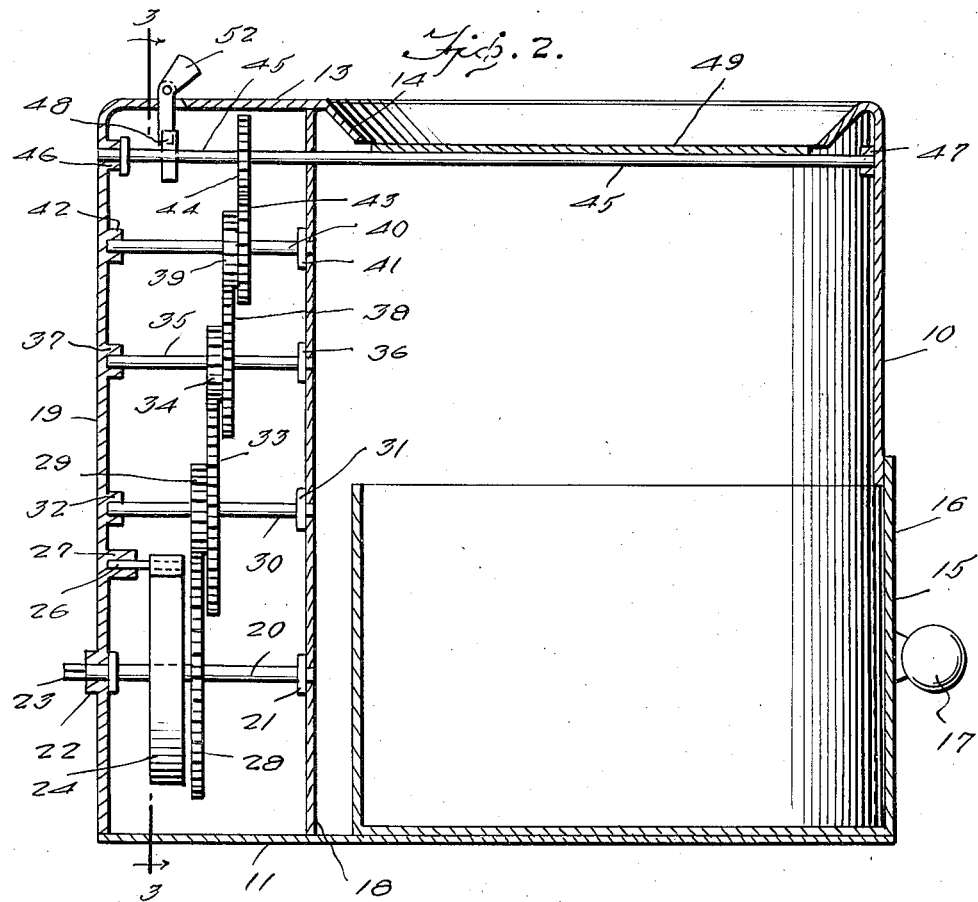
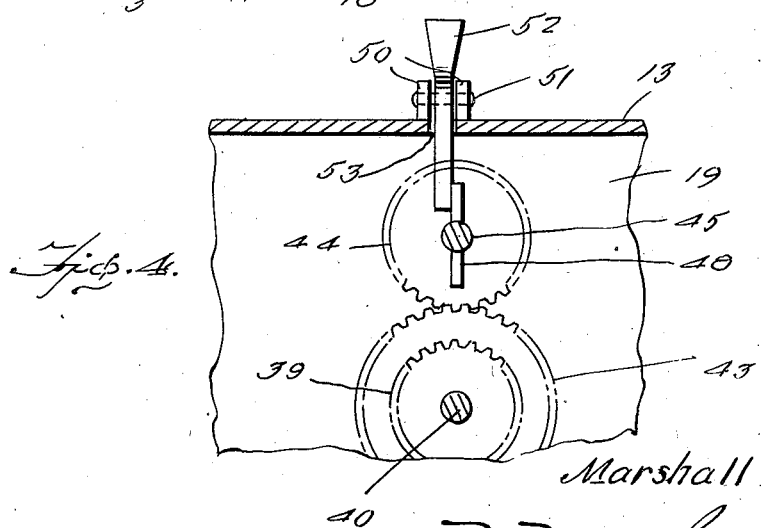
Inventor
Marshall F. Meadows
Attorneys Patented Feb. 17, 1948

2,436,012

UNITED STATES PATENT OFFICE 2,436,012

ASH TRAY

Marshall F. Meadows, New Orleans, La., assignor of one-half to Vincent M. Musemeche, New Iberia, La.

Application October 16, 1945, Serial No. 622,524

5 Claims. (Cl. 232—1)

This invention relates to ash trays and more especially to that kind of ash trays which have a tiltable or rotatable cover or lid.

The main object of this invention is to provide an ash tray with a lid or cover which is adapted to be tilted or rotated in a vertical plane by means of an automatic mechanical device.

Another object of the invention is to provide an ash tray with a lid or cover adapted to receive and hold ashes of cigars, cigarettes, etc., burned matches and the like which can be tilted by a mechanical device to dump said ashes, etc. into a container provided underneath the rotatable lid.

A further object of the invention is to provide an ash tray with a vertically rotatable lid, which is normally held in a horizontal position and covers a receptacle for ashes and the like and prevents them from being blown about and marring or dirtying the surroundings, said lid being adapted to receive and hold the ashes and the like until an automatic mechanical device is manually released to rotate the lid and dump its contents into the container below the lid.

A still further object of the invention is to produce an ash tray having a common housing for the mechanical actuating device, the container for ashes and the like, the device for releasing and locking the lid rotating mechanism and to support the lid.

In general the object of the invention is to provide an ash tray which can be cheaply produced and serves the dual purpose of being practical as well as ornamental.

Other objects of the invention may appear in the following description which will be best understood by reference to the accompanying drawings forming a part of said description.

In the drawings

Fig. 1 is a top view of the ash tray according to this invention.

Fig. 2 is a vertical sectional view taken substantially on line 2—2 of Fig. 1.

Fig. 3 is a sectional view taken substantially on line 3—3 of Fig. 2.

Fig. 4 is a detail in enlarged scale showing the device for locking and releasing the rotatable lid or disc in locking position, and Fig. 5 is an enlarged detail of the locking device showing its position permitting the lid to rotate.

Referring to the drawings the ash tray of this invention has a housing consisting of substantially vertical body walls 10 and a bottom 11. In the present illustration the front wall of the body is shown as being semi-circular. It is however to be understood that the body may have any desired shape, as long as the effect is ornamental. The rear part of the housing is somewhat reduced in width in comparison with the front or main portion but is symmetrical about the vertical center plane of the body. The top of the body is formed by bending the walls inwardly and horizontally as shown at 13 and here they have a downwardly inclined circular lip 14 forming a circular opening in the top to permit the entrance of ashes of cigars or cigarettes, burned matches and the like.

The front part of the housing wall 10 has a square or oblong opening 15 therein extending from the bottom 11 upwardly permitting a container 16, which is open on top, to slide freely into said housing. This container extends backwardly and laterally far enough to catch any waste material thrown into the opening in the top of the housing. The container 16 is provided at its front with an ornamental handle of any desired shape.

The rear portion of the housing, which is reduced in width, as mentioned above, is partitioned from the front part by means of a partition or wall 18 extending from the bottom 11 to the top 13, as plainly shown in Fig. 2, and also extending from one side wall of the reduced housing portion to the other, as indicated in Fig. 1.

In this manner a chamber 19 is formed which serves as a housing for a mechanical driving device more fully described in the following:

A shaft 20 is rotatably mounted in the bearings 21 and 22 provided on the partition 18 and the rear wall of chamber 19 respectively. The rear end of shaft 20 extends beyond the rear wall and through the bearing 22 and is squared as indicated at 23 in Fig. 2. The inner end of a spiral clock spring 24 is fastened to the shaft 20 at 25 and the outer end of this spring is attached to a stationary pin 26 set into a boss 27 on the rear wall of chamber 19.

A gear 28 is rigidly mounted on shaft 20 and meshes with a gear 29 keyed onto a second shaft 30 rotatably mounted in bearings 31 and 32 provided on the partition 18 and the rear wall of chamber 19 respectively. Another gear 33 is rigidly mounted on shaft 30 and meshes with a gear 34 fast on a shaft 35, which is rotatably supported by bearings 36 and 37 on partition 18 and the rear wall of the chamber 19 respectively. A gear 38 rigidly mounted on shaft 35 meshes with a gear 39 keyed to a shaft 40 rotatably mounted in bearings 41 and 42 on the partition 18 and the rear wall of the chamber 19, respectively. On this shaft 40 another gear 43 is rigidly mounted and meshes with a gear 44 keyed onto a shaft 45. This shaft 45 is rotatably supported in a bearing 46 on the rear wall of the chamber 19, extends through an opening in partition 18 to another bearing 47 attached to the front wall of the housing body 10.

A square pin 48 extends diametrically through the shaft 45 between the gear 44 and the rear wall of chamber 19.

This shaft 45 is so arranged that it extends diametrically in relation to the circular opening in the top of the housing and just underneath the edge of the lip 14. A circular disc 49 is fastened onto the shaft 45 so that it lies at right angles to the square pin 38. The diameter of the disc 49 is somewhat smaller than the diameter of the opening formed by the circular lip 14 as plainly shown in Fig. 1.

Two small blocks 50 extend upwardly from the top of the chamber 19 at a distance from each other. A pivot pin 51 extends through these blocks and a crank lever 52 is pivotally mounted on said pin between the blocks. The lower leg of this lever extends through a slot 53 in the top of the chamber 19. The blocks 50 and the slot 53 and the crank lever 52 are so arranged that the lower leg of lever 52 will be located in the path of rotation of the square pin 48, when both these parts are extending vertically.

The spring 24 can be wound up by means of a key (not shown) fitting onto the squared end 23 of the shaft 20. The square pin 48 and the lever 52 cooperate to the purpose of preventing shafts 30, 35, 40 and 45 from rotating, when they both are in vertical position, because the lever is then located in the path of rotation of the pin. At that time the circular disc 49 is in horizontal position just inside the opening formed by the lip 14 and any ashes or the like thrown into the ash tray will fall and rest on said disc, which in this manner serves as a cover for the container 16. When the crank lever 52 is moved into disc releasing position, as shown in Fig. 5, the lower leg of said lever will be moved out of the path of rotation of the square pin 48 thereby permitting all the shafts to rotate under the force of the spring 24. Thus the circular disc 49 will be rotated about the axis of the shaft 45 and any ashes or the like located on said disc will be dumped into the container 16. The speed of rotation of the disc 49 can be regulated by means of the ratio of transmission between the gears 28, 29, 33, 34, 38, 39 and 44.

From the above description it will be understood that an ash tray according to this invention combines the virtues of being practical and ornamental.

What I claim and desire to secure by Letters Patent is:

1. In an ash tray, a hollow body having an opening in its top, a disc vertically rotatable in said opening and of a size to practically close it when in horizontal position, a train of gears connected with the disc, a spring adapted to actuate the train of gears, and a manually operable stop restricting movement of said gears and springs to stop the disc in a position to close the opening.

2. In an ash tray, a hollow body having an opening in its top, a spiral spring, means for winding said spring, a train of gears arranged to be driven by said spring, a manually releasable stop associated with said gear, the shaft of the last gear in said train extending diametrically to and just underneath said opening, and a disc fastened to said shaft and adapted to rotate therewith in said opening, said stop being operable to stop the disc in a position to close the opening.

3. In an ash tray, a hollow body having an opening in its top, a partition dividing the inside of the body into an ash receiving portion associated with the opening and a smaller gear chamber, a disc located in said opening and of a size to practically close it when in horizontal position, a spring arranged in the gear chamber, means for winding said spring, a train of gears in said gear chamber and adapted to be rotated by said spring, the shaft of the last gear in the train extending through the gear chamber and the main part of the body, said disc being attached to said shaft, and manually operable cooperating means on said shaft and on said top of the body for locking and releasing said shaft for rotation, said last mentioned means being operable to stop the disc in a position to close the opening.

4. In an ash tray, a hollow body having an opening in its top, a spiral spring, means for winding said spring, a train of gears adapted to be rotated by said spring, a shaft mounting the last gear in the train extending below and across said opening, a disc of a size to practically close said opening mounted on said shaft, a stop pin extending diametrically through said shaft, and a crank lever pivotally supported on the top of the body, said lever extending through a slot in said top into the body and adapted to be moved into and out of the path of rotation of the stop pin, for holding and releasing said train of gears, said lever being operable to stop the disc in a position to close the opening.

5. In an ash tray, a hollow body having an opening in its top, a disc rotatable in said opening about a horizontal axis, said disc being of a size to substantially close the opening when in horizontal position, means within the hollow body for continuously rotating the disc, and means for controlling the operation of said rotating means to stop the disc in a position to close the opening.

MARSHALL F. MEADOWS.

REFERENCES CITED

The following references are of record in the file of this patent:

UNITED STATES PATENTS

| Number | Name | Date |
|---|---|---|
| Re. 17,500 | Stevenson et al. | Nov. 26, 1929 |
| 1,237,014 | Botty, Jr. et al. | Aug. 14, 1917 |
| 1,903,994 | Goldman | Apr. 18, 1933 |